(12) United States Patent
Thueringer et al.

(10) Patent No.: US 6,883,103 B2
(45) Date of Patent: Apr. 19, 2005

(54) DATA CARRIER FOR THE ADAPTATION OF A CONSUMPTION TIME INTERVAL TO THE POWER CONSUMPTION OF THE DATA CARRIER

(75) Inventors: Peter Thueringer, Graz (AT); Klaus Ully, Graz (AT); Markus Feuser, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 629 days.

(21) Appl. No.: 09/867,893

(22) Filed: May 30, 2001

(65) Prior Publication Data

US 2002/0010871 A1 Jan. 24, 2002

(30) Foreign Application Priority Data

May 31, 2000 (EP) ............................................ 00890178

(51) Int. Cl.⁷ ................................................ G06F 1/26
(52) U.S. Cl. ........................ 713/320; 713/300; 713/310; 713/340; 307/109; 307/110; 307/140; 235/380; 235/492; 235/493
(58) Field of Search ................................ 713/200, 300, 713/310, 320, 330, 340, 323; 307/109, 110, 140; 235/492, 493, 380

(56) References Cited

U.S. PATENT DOCUMENTS

| | | | | |
|---|---|---|---|---|
| 3,790,890 A | * | 2/1974 | Doittau et al. | ............... 368/121 |
| 3,846,699 A | * | 11/1974 | Martyashin et al. | ......... 324/652 |
| 4,097,727 A | * | 6/1978 | Ulch | ........................... 235/382 |
| 4,780,813 A | * | 10/1988 | Gerety et al. | .................. 710/46 |
| 5,241,160 A | * | 8/1993 | Bashan et al. | ............... 235/380 |
| 5,449,894 A | * | 9/1995 | Bruhnke et al. | ............. 235/492 |
| 5,729,053 A | * | 3/1998 | Orthmann | ..................... 257/724 |
| 5,754,462 A | * | 5/1998 | Little | ................................ 1/1 |
| 5,852,290 A | * | 12/1998 | Chaney | ........................ 235/492 |
| 5,959,471 A | * | 9/1999 | Weinfurtner | .................. 327/94 |
| 5,998,978 A | * | 12/1999 | Connell et al. | .............. 323/273 |
| 6,098,890 A | * | 8/2000 | Kreft et al. | ................... 235/492 |
| 6,419,159 B1 | * | 7/2002 | Odinak | ........................ 235/492 |
| 6,507,130 B1 | * | 1/2003 | Thuringer et al. | ............. 307/70 |
| 6,507,913 B1 | * | 1/2003 | Shamir | ........................ 713/200 |
| 6,772,946 B1 | * | 8/2004 | Ruat et al. | .................... 235/451 |

FOREIGN PATENT DOCUMENTS

| | | | |
|---|---|---|---|
| DE | WO 97/08929 | * | 3/1997 |
| WO | 0026868 A1 | | 5/2000 |

* cited by examiner

Primary Examiner—Lynne H. Browne
Assistant Examiner—Nitin C. Patel
(74) Attorney, Agent, or Firm—Kevin Simons

(57) ABSTRACT

A data carrier that communicates confidential data is configured to mask process-dependent power consumption by using power stored in an internal capacitor. The capacitor is initially charged to the voltage of an external power source, and then decoupled from the external power source. The capacitor provides power to an internal processor, and consequently discharges gradually. At the end of a given time interval, the capacitor is discharged to a fixed voltage, then charged to the supply voltage. In this manner the power consumed by charging of the capacitor is decoupled from the power consumed by the processor. If the capacitor drops below a threshold voltage before processing is completed, the processor is halted. To optimize the available processing time, the time interval before discharging the capacitor to the fixed voltage is dynamically adjusted to reduce the time that the processor is halted.

13 Claims, 1 Drawing Sheet

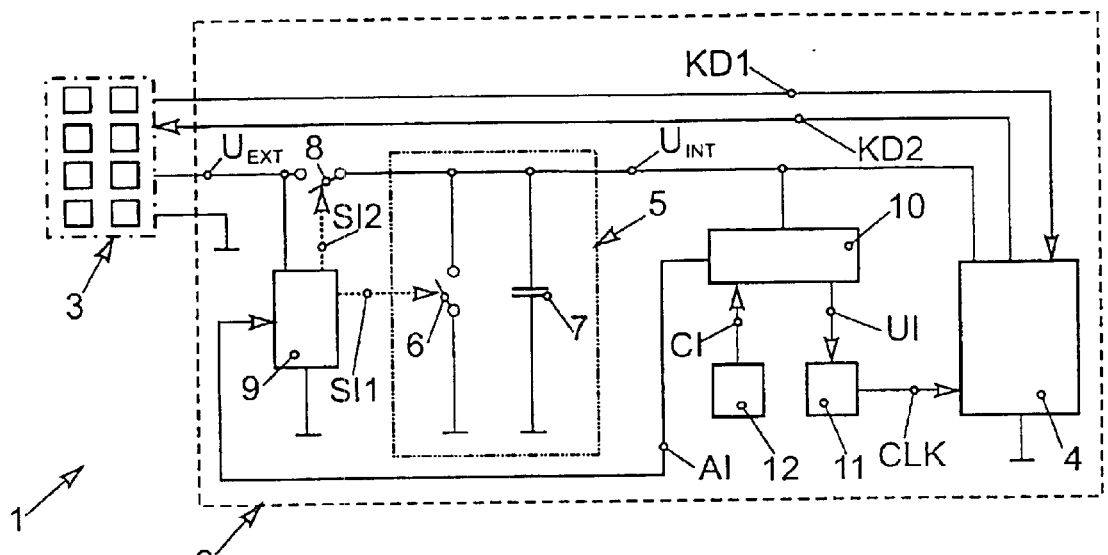
FIG. 1
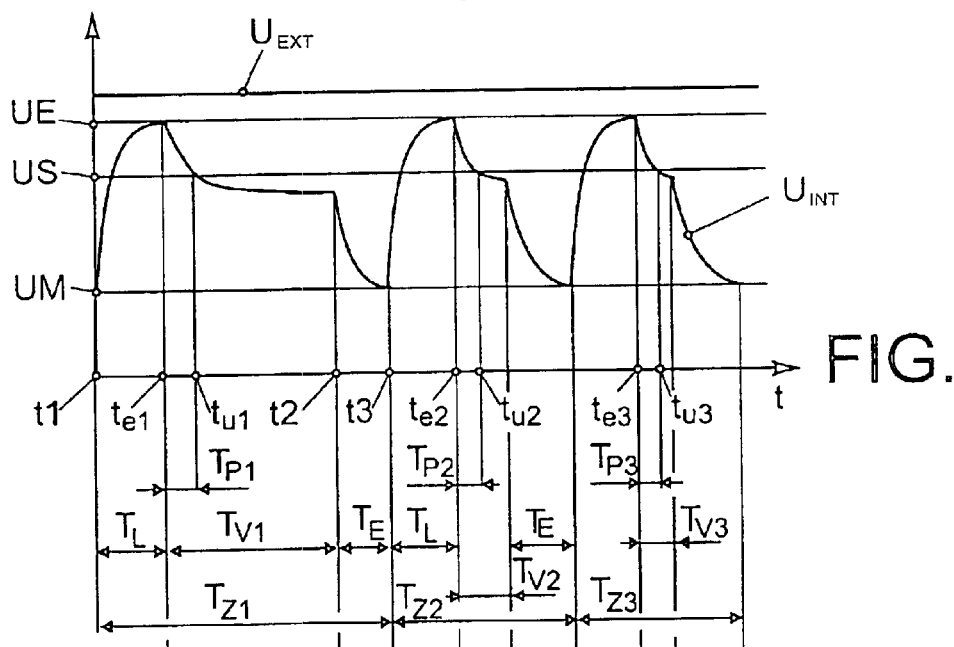
FIG. 2A
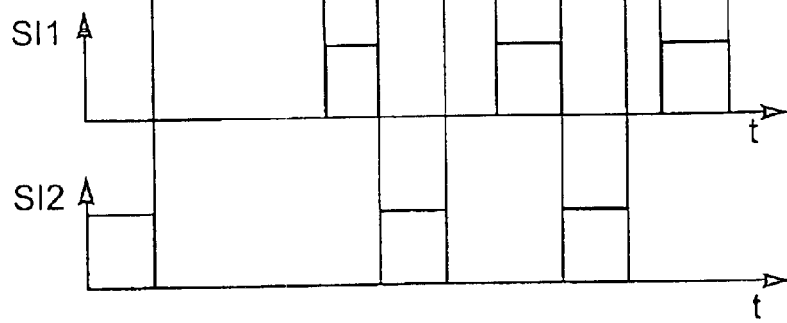
FIG. 2B
FIG. 2C

DATA CARRIER FOR THE ADAPTATION OF A CONSUMPTION TIME INTERVAL TO THE POWER CONSUMPTION OF THE DATA CARRIER

The invention relates to a data carrier for the communication of communication data with a base station, having processing means for the processing of communicated communication data, and having voltage supply means which are arranged to receive an external supply voltage applied to the data carrier during a charging time interval until a turn-on instant and which are adapted to supply an internal supply voltage to the processing means, decoupled from the external supply voltage, during a consumption time interval starting at the turn-on instant, the processing means being adapted to interrupt the processing from an interruption instant, when the internal supply voltage decreases below a threshold voltage, till the turn-on instant.

Such a data carrier of the type defined in the opening paragraph is known from U.S. Pat. No. 6,507,130, "DATA CARRIER WITH PROTECTION AGAINST SPY OUT", issued 14 Jan. 2003 to Peter Thueringer and Edgar Rieger and is formed by a transponder of a smart card. The known data carrier is adapted to communicate communication data from or to a base station via a contact pad of the smart card. The data carrier has processing means for processing the communication data received via the contact pad or to be output via the contact pad.

The processing means then execute a processing program in which general arithmetic operations, cryptographic arithmetic operations for encrypting and decrypting confidential information or data, and further processing steps are performed during read and write access to the memory means. The power consumption of the data carrier differs depending on the processing step being carried out and on the bit combination of the data being processed.

In order to preclude spying out of processed confidential data by a hacker through analysis of the power consumption in the individual processing steps, which power consumption can be detected at the contact pad, the known data carrier has special voltage supply means. These voltage supply means include a capacitor which, during a charging time interval, is charged with an external supply voltage via the contact pad until a turn-on voltage is reached at a turn-on instant. Subsequently, the capacitor, decoupled from the external supply voltage, supplies an internal supply voltage to the processing means during a consumption time interval.

During a discharge time interval following the consumption time interval the capacitor is discharged to a minimum voltage, upon which it is recharged. This guarantees a decoupling of the internal power consumption from the external power consumption that can be determined by measurement via the contact pad.

The processing means interrupt the execution of the processing program when during the consumption time interval the internal supply voltage decreases below a threshold voltage at an interruption instant. Thus, it is prevented that the power stored in the capacitor is inadequate to complete a processing step with a high power consumption, which could lead to erroneous computing or storage results.

With the known data carrier it has proved to be a disadvantage that during processing steps with a high power consumption the processing by the processing means is already interrupted comparatively soon after the turn-on instant and the remainder of the fixed predetermined consumption time interval is not used as processing time for the execution of the processing program. As a result of this, processing steps with a high power consumption require a comparatively long processing time, which is a major disadvantage.

It is an object of the invention to provide a data carrier in which processing steps with a high power consumption have a substantially shorter processing time while the high immunity against hacking of confidential data is maintained. According to the invention, in order to achieve this object with a data carrier of the type defined in the opening paragraph, there are provided time measurement means which are adapted to measure a processing time interval defined as the time interval from the turn-on instant till the interruption instant, and the voltage supply means are configured to adapt the consumption time interval to the measured processing time interval.

Thus, it is achieved that the consumption time interval is measured and reduced continuously until essentially the entire consumption time interval is utilized as processing time interval. When some processing steps with a high power consumption are again followed by processing steps with a lower power consumption, the consumption time interval is extended until essentially the entire consumption time interval is utilized again as processing time interval.

This has the advantage that the ratio between the processing time interval and the consumption time interval of the data carrier can be improved considerably, particularly for processing steps with a high power consumption, which enables the processing program to be executed with a higher speed. As in the data carrier in accordance with the invention the processing means also execute a plurality of processing steps in one processing time interval each, the internal power consumption remains decoupled from the external power consumption, which can be detected via the contact pad, which has the advantage that confidential information cannot be hacked.

The measures as defined in claim 2 have the advantage that a reliable slow adaptation of the consumption time interval to the processing time interval is achieved as a result of the stepwise reduction of the consumption time interval.

The measures as defined in claim 3 have the advantage that the consumption time interval is prolonged very rapidly when the entire processing time interval which is possible until the threshold voltage is crossed is not utilized for the execution of processing steps.

The measures as defined in claim 4 have the advantage that a hacker cannot detect any patterns in the internal power consumption.

The measures as defined in claim 5 have the advantage that the consumption time interval is already adapted right from the start to the directly following processing steps to be executed.

The invention will now be described in more detail hereinafter with reference to an embodiment given by way of example but to which the invention is not limited.

FIG. 1 shows a smart card for the contact-bound communication of communication data via a contact pad, which card has time measurement means for the measurement of the processing time interval.

FIG. 2 shows the external supply voltage and the internal supply voltage of the smart card as functions of time and switching information appearing in the smart card of FIG. 1 as a function of time.

FIG. 1 shows a smart card 1 which includes a data carrier 2 and a contact pad 3. The data carrier 2 is adapted to provide contact-bound communication of communication data KD1 and KD2 with a base station. The base station can be, for example, an automated teller machine for dispensing cash. During such contact-bound communication communication data KD1 and KD2 are transferred via the contact pad 3 of the smart card 1 and a contact pad of the base station, which both comply with the standard ISO7816. The data carrier 2 is energized with an external supply voltage $U_{EXT}$ from the base station via the contact pad 3.

The data carrier 2 includes processing means 4 for processing the communication data KD1 received from the base station and the communication data KD2 to be transferred to the base station. The processing means 4 include, for example, a microprocessor of the type 80C51, a co-processor for encrypting and decrypting confidential information or data, memory means (ROM) for the storage of a processing program and intermediate memory means (RAM).

Communication data KD1 and KD2 processed by the data carrier 2 or stored in the memory means and read out during the processing may include confidential information, such as for example a bank code. This confidential information should in no way be readable by a non-authorized person, referred to as a hacker.

In order to preclude this, the data carrier 2 has voltage supply means 5 which decouple an internal supply voltage $U_{INT}$ generated by the voltage supply means 5 from the external supply voltage $U_{EXT}$ during the processing of confidential information by the processing means 4. Thus, it is precluded that a hacker can deduce the power consumption of the processing means 4 during the execution of a single processing step of the processing program by analyzing the power consumption of the data carrier 2, which can be detected at the contact pad 3. If such a deduction were possible, the confidential data transmitted for example from the microprocessor to the memory means via an internal data bus during a memory processing step could be hacked because the power consumption of the processing means 4 during this memory processing step depends on the number "1" bits and "0" bits of the confidential data.

The voltage supply means 5 include a first switch 6 and a capacitor 7, which serves for power storage. The switch position of the first switch 6 and a second switch 8 is controlled by voltage control means 9 by the supply of first switch information SI1 or second switch information SI2, which is illustrated in FIGS. 2B and 2C and will be elucidated hereinafter.

FIG. 2A shows the external supply voltage $U_{EXT}$ and the internal supply voltage $U_{INT}$ as functions of time, the internal supply voltage $U_{INT}$ having a periodicity in voltage supply cycles with a cycle time interval $T_Z$. At the beginning of the cycle time interval $T_{Z1}$, from an instant t1, the voltage control means 9 do not supply first switch information SI1 to the first switch 6 but they supply the second switch information SI2 to the second switch 8. Consequently, the first switch 6 is open and the second switch 8 is closed, as a result of which the external supply voltage $U_{EXT}$ is supplied to the capacitor 7 for a charging time interval $T_L$ until a first turn-on instant $t_{e1}$, when the capacitor 7 has been charged to a turn-on voltage UE.

The power stored in the capacitor 7 at the first turn-on instant $t_{e1}$ serves as a power storage for the processing means 4 and further power-consuming means of the data carrier 2 during a first consumption time interval $T_{V1}$, of the first voltage supply cycle. In order to decouple the processing means 4 from the external supply voltage $U_{EXT}$ during the execution of the processing program, the voltage control means 9 stop the supply of the second switch information SI2 at the first turn-on instant $t_{e1}$.

As a result of this, both the first switch 6 and the second switch 8 are opened and the capacitor 7 supplies the internal supply voltage $U_{INT}$ to the processing means 4 and the further power-consuming means of the data carrier 2. The voltage value of the internal supply voltage $U_{INT}$ now decreases continually in dependence on the power consumption of the data carrier 2.

The data carrier 2 includes a voltage measurement stage 10 adapted to measure the instantaneous voltage value of the internal supply voltage $U_{INT}$. The voltage measurement stage 10 is adapted to supply interrupt information UI to the clock generation means 11 of the data carrier 2 when the internal supply voltage $U_{INT}$ decreases below a threshold voltage US during the first consumption time interval $T_{V1}$, at a first interruption instant $t_{u1}$. The clock generation means 11 do not supply a clock signal CLK to the processing means 4 from the reception of the interrupt information UI until the next, i.e. a second, turn-on instant $t_{e2}$ is reached.

As a result, the processing means 4 execute the processing program during the first cycle time interval $T_{Z1}$ from the first turn-on instant $t_{e1}$ until the first interruption instant $t_{u1}$ is reached and interrupt the execution of the processing program when the internal supply voltage $U_{INT}$ decreases below the threshold voltage US during the first consumption time interval $T_{V1}$, at the first interruption instant $t_{u1}$. Thus, it is precluded that a processing step having a high power consumption is started with the residual power available in the capacitor 7 after the first interruption instant $t_{u1}$ and cannot be completed owing to an inadequate supply voltage $U_{INT}$, which could lead to erroneous computing or storage results.

After the expiry of the first consumption time interval $T_{V1}$ at an instant t2 the voltage control means 9 supply the first switch information SI1 to the first switch 6, as a result of which the capacitor 7 is discharged during a discharge time interval TE until a minimum voltage UM is reached at an instant t3. The first cycle time interval $T_{Z1}$ of the first supply voltage cycle of the voltage supply means 5 ends at the instant t3.

Discharging the capacitor 7 until the minimum voltage UM is reached has the advantage that after the first voltage supply cycle during the charging time interval $T_L$ of the subsequent second voltage supply cycle a hacker cannot draw any conclusions from the power consumption of the processing means during the first voltage supply cycle.

The operation of the voltage supply means 5 as described above provides a maximal immunity to analysis attempts by a hacker but the first processing time interval $T_{P1}$ actually available during the first cycle time interval $T_{Z1}$ to the processing means 4 in order to execute the processing program is comparatively short. During subsequent voltage supply cycles with such a short processing time interval $T_P$ the execution of the processing program, particularly in the case of several consecutive processing steps with a high power consumption, would require a comparatively long time, which would be a disadvantage.

The data carrier 2 now has time measurement means 12 adapted to measure the processing time interval $T_{P1}$ between the first turn-on instant $t_{e1}$ and the first interruption instant $t_{u1}$. The time measurement means 12 are formed by a counter, which is started by the voltage measurement stage 10 at the first turn-on instant $t_{e1}$ and stopped at the first interruption instant $t_{u1}$.

The count thus determined by the counter is applied to the voltage measurement stage 10 as counter information CI and is evaluated by the voltage measurement stage 10. The voltage measurement stage 10 subsequently supplies adaptation information AI to the voltage control means 9 in order to adapt the second consumption time interval $T_{V2}$. By means of the adaptation information AI the instant at which the first switch information SI1 is to be supplied is changed for the following second voltage supply cycle is changed in the voltage control means 9.

Thus, it is achieved that the processing time interval $T_P$ of each voltage supply cycle is measured and the consumption time interval $T_V$ of the next volt supply cycle is reduced until essentially the entire consumption time interval $T_V$ is used as a processing time interval $T_P$. When after some voltage supply cycles with processing steps with a high power consumption again a voltage supply cycle with processing steps with a lower power consumption occurs, the consumption time interval $T_V$ is prolonged until essentially the entire consumption time interval $T_V$ is used again as a processing time interval $T_P$.

This has the advantage that the ratio between the processing time interval $T_P$ and the cycle time interval $T_Z$ of each voltage supply cycle of the data carrier 2, particularly in the case of processing steps with a high power consumption, can be improved substantially, which enables the processing program to be executed at a higher speed. Since the processing means 4 perform a plurality of processing steps during each voltage supply cycle the internal power consumption of a single processing step remains decoupled from the external power consumption, which can be determined at the contact pad, which advantageously precludes retrieval of confidential information by a hacker.

It is to be noted that the consumption time interval $T_V$ could also be made equal to the processing time interval $T_P$, i.e. the capacitor 7 could be discharged during the discharge time interval $T_E$ immediately after the interruption instant $t_u$. However, this would have the big disadvantage that the processing time interval $T_V$ has a direct influence on the cycle time interval $T_Z$, which can be detected by a hacker, as a result of which conclusions could be drawn about the power consumption of the processing means 4. Therefore, in accordance with the invention, the consumption time interval $T_V$ is approximated stepwise to the processing time interval $T_P$ but the two time intervals have hardly ever the same value.

Thus, it is achieved that the length of the consumption time interval $T_V$ is adapted to the power consumption, which depends on the arithmetic operations of the processing steps of the cycle time interval $T_Z$ that is in progress. Thus, power consumption of the data carrier 2 that can be detected by a hacker also depends on the power consumption of the type of the relevant arithmetic operation but there is no dependence of the detectable power consumption on any confidential data processed with the arithmetic operations.

As is apparent from FIG. 2A, the voltage control means 9 control the first switch 6 and the second switch 8 in such a manner that the second consumption time interval $T_{V2}$ is only approximately twice as long as the second processing time interval $T_{P2}$. During the second processing time interval $T_{P2}$ the processing means 4 therefore execute approximately as many processing steps as during the first processing time interval $T_{P1}$, the second cycle time interval $T_{Z2}$ being preferably subsequently shorter than the first cycle time interval $T_{Z1}$.

In response to the counter information CI determined by the time measurement means 12 during the second voltage supply cycle the voltage measurement stage 10 supplies further adaptation information AI to the voltage control means 9 for a further reduction of a third consumption time interval $T_{V3}$ during a third voltage supply cycle. This has the advantage that the third consumption time interval $T_{V3}$ is further reduced with respect to the second consumption time interval $T_{V2}$ and is adapted to the power consumption of the processing means 4 and further power-consuming means in the data carrier 2.

During a fourth voltage supply cycle, which is not shown in FIG. 2A and which follows the third voltage supply cycle the processing means 4 consume considerably less power than in the third voltage supply cycle. As a result of this, a fourth consumption time interval, which has already been reduced to a comparatively short length, already ends before the internal supply voltage $U_{INT}$ has decreased below the threshold voltage US. Subsequently, the voltage measurement stage 10 supplies adaptation information AI to the voltage control means 9 in order to prolong a fifth consumption time interval for a subsequent fifth voltage supply cycle to a nominal consumption time interval length stored in the memory means.

This has the advantage that the consumption time interval $T_V$ is prolonged very rapidly when the processing means 4 cannot utilize the entire processing time interval $T_P$, which is possible until the decrease below the threshold voltage US, for executing processing steps of the processing program.

It is to be noted that the voltage supply means 5 may be adapted to prolong the consumption time interval to a random consumption time interval selected from a plurality of nominal consumption time intervals that are possible, when during the consumption time interval the internal supply voltage $U_{INT}$ has not decreased below the threshold voltage US. This would have the advantage that a hacker cannot detect any pattern in the internal power consumption.

It is to be noted that memory means may be adapted to store power information characteristic of the power consumption of the processing means 4 during the execution of processing steps of the processing program, and the voltage supply means 5 may be adapted to define the consumption time interval $T_V$ in accordance with the power information stored for the next processing steps to be executed. Thus, the power consumption of the data carrier during the execution of the processing program could be analyzed once by a persons authorized to do so and corresponding power information could be stored in the data carrier. This would have the advantage that the consumption time interval can be adapted already right from the start to the directly following processing steps and will consequently always have an optimum value.

It is to be noted that the data carrier may be formed by an integrated circuit, enabling the data carrier to be manufactured cheaply.

It is to be noted that a data carrier in accordance with the invention may also be adapted to provide contactless communication of communication data and that a hacker could use a field sensor to analyze the power consumption of the data carrier. This is advantageously precluded by the voltage supply means of such a data carrier and the provision of the time measurement means in accordance with the invention in the data carrier for contactless communication will in addition have the advantages described hereinbefore.

What is claimed is:

1. A data carrier for the communication of communication data with a base station, comprising:
   processing means for the processing of communicated communication data, and
   voltage supply means which are arranged to receive on external supply voltage applied to the data carrier during a charging time interval until a turn-on instant and which are adapted to supply an internal supply voltage to the processing means, decoupled from the external supply voltage, during a consumption time interval starting at the turn-on instant, the processing means being adapted to interrupt the processing from an interruption instant, when the internal supply voltage decreases below a threshold voltage, until the turn-on instant, characterized in that there are provided time measurement means which are adapted to measure a processing time interval defined as the time interval from the turn-on instant until the interruption instant, and the voltage supply means are adapted to adapt the consumption time interval to the measured processing time interval.

2. A data carrier as claimed in claim 1, characterized in that the voltage supply means are adapted to reduce the consumption time interval stepwise when the consumption time interval is longer than the processing time interval.

3. A data carrier as claimed in claim 1, characterized in that the voltage supply means are adapted to prolong the consumption time interval to a nominal consumption time interval when the internal supply voltage does not decrease below the threshold voltage during the consumption time interval.

4. A data carrier as claimed in claim 1, characterized in that the voltage supply means are adapted to prolong die consumption time interval to a random consumption time interval selected at random from a plurality of possible nominal consumption time intervals when the internal supply voltage does not decrease below the threshold voltage during the consumption time interval.

5. A data carrier as claimed in claim 1, characterized in that memory means are adapted to store power information characteristic of the power consumption of the processing means during the execution of processing steps of the processing program, and the voltage supply means are adapted to define the consumption time interval in accordance with the power information stored for the next processing steps to be executed.

6. A device comprising:
   a processor that is configured to process data,
   a capacitor that is configured to provide power to the processor, and
   a controller that is configured to:
      decouple the capacitor from a power source at a first time,
      monitor a voltage on the capacitor and interrupt the processor at a second time after the first time if the voltage on the capacitor falls to a first voltage level,
      discharge the capacitor at a third time after the first time, and
      couple the capacitor to the power source at a fourth time after the third time, so that power consumed by the processor between the first and third times is substantially masked from power provided by the power source, and
   wherein
   the third time is dependent upon an interval between the second and third times of a prior sequence of interrupting the processor and discharging the capacitor.

7. The device of claim 6, further including
   a counter that is configured to measure the interval between the second and third times.

8. The device of claim 6, further including
   a memory that is configured to store parameters based on the interval between the second and third times.

9. The device of claim 6, wherein
   the third time is also dependent upon a random variable.

10. A method of masking power consumption of a processor comprising:
    decoupling an internal power source from an external power source at a first time,
    monitoring a voltage on the internal power source and interrupting the processor at a second time after the first time if the voltage on the internal power source falls to a first voltage level,
    reducing the voltage on the internal power source at a third time after the first time, and
    coupling the internal power source to the external power source at a fourth time after the third time, so that power consumed by the processor between the first and third times is substantially masked from power provided by the external power source, and,
    modifying the third time for a subsequent repetition of the method, based on an interval between the second time and the third time.

11. The method of claim 10, further including
    counting to measure the interval between the second and third times.

12. The method of claim 10, further including
    storing parameters in a memory, based on intervals between the second and third times of other repetitions of the method.

13. The method of claim 10, wherein
    modifying the third time is also dependent upon a random variable.

* * * * *